United States Patent
Thomas et al.

(10) Patent No.: US 7,849,206 B2
(45) Date of Patent: Dec. 7, 2010

(54) SERVICE FOR POLICY RULE SPECIFICATION EVALUATION AND ENFORCEMENT ON MULTIPLE COMMUNICATION MODES

(75) Inventors: Shawn Thomas, Bothell, WA (US); Steve Clagg, Seattle, WA (US); Gautam Pulla, Redmond, WA (US); Yamin Wang, Bellevue, WA (US); Jeffrey Kay, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 170 days.

(21) Appl. No.: 12/353,121

(22) Filed: Jan. 13, 2009

(65) Prior Publication Data

US 2010/0180041 A1 Jul. 15, 2010

(51) Int. Cl.
*G06F 15/16* (2006.01)
*G06F 15/173* (2006.01)

(52) U.S. Cl. .............. 709/230; 709/224; 709/229; 709/232; 709/239

(58) Field of Classification Search .......... 709/206, 709/224, 225, 229, 230, 232, 239
See application file for complete search history.

(56) References Cited

U.S. PATENT DOCUMENTS

| | | | |
|---|---|---|---|
| 7,536,437 B2 * | 5/2009 | Zmolek | 709/206 |
| 7,774,368 B2 * | 8/2010 | Ring et al. | 707/792 |
| 2003/0154293 A1 * | 8/2003 | Zmolek | 709/228 |
| 2004/0167984 A1 | 8/2004 | Herrmann | |
| 2005/0080914 A1 | 4/2005 | Lerner et al. | |
| 2007/0150936 A1 | 6/2007 | Maes | |
| 2008/0056500 A1 | 3/2008 | Bradley et al. | |
| 2008/0059643 A1 | 3/2008 | Moss | |
| 2008/0072284 A1 | 3/2008 | Horvitz et al. | |
| 2009/0291704 A1 * | 11/2009 | Korus et al. | 455/519 |

OTHER PUBLICATIONS

Wood, Charles Cresson, "How to Build a Corporate Culture of Policy Compliance", retrieved at <<http://searchsecurity.techtargetcom/tip/0,289483,sid14_gci968795,00.html>>, Nov. 20, 2008, pp. 7.

"Fedora Authorization with XACML Policy Enforcement", retrieved at <<http://www.fedorainfo/download/2.1b/ userdocs/server/security/AuthorizationXACML.htm>>, Nov. 20, 2008, pp. 19.

Lewis, et al., "Policy-based Management for Resource-Specific Semantic Services", retrieved at <<http://www.ctvr.ie/docs/EN_Pubs/danms06_lewis.pdf>>, pp. 8.

"Troubleshooting Client Authentication on Access Rules in ISA Server 2004", retrieved at <<http://technet.microsoft.com/en-us/library/cc302664.aspx>>, Nov. 20, 2008, pp. 10.

* cited by examiner

*Primary Examiner*—Quang N. Nguyen
(74) *Attorney, Agent, or Firm*—Turk IP Law, LLC

(57) ABSTRACT

Policy rules for a particular communication mode are adapted and implemented for other communication modes in a dynamic and/or automated manner. Organization level and/or personal policies for one communication mode are evaluated and modified as necessary for other communication modes, which may be integrated with each other or distinctly managed. Rules may be adapted based on user, groups, or policy types.

17 Claims, 7 Drawing Sheets

SERVICE FOR POLICY RULE SPECIFICATION EVALUATION AND ENFORCEMENT ON MULTIPLE COMMUNICATION MODES

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Such systems may provide subscribers with the enhanced capabilities such as providing instructions to callers for various status categories, alternate contacts, calendar information, and comparable features.

When provided as individual communication services, each communication mode is typically associated with organization level, personal, and similar policies. Organization level policies may define when and how certain communications may be facilitated, what security measures have to be adhered to, and similar rules. Personal policies may be geared more toward automation and efficient handling of communications such as when and how communications associated with a particular subscriber may be forwarded, what to do when the subscriber is unavailable, or even how to handle incoming communications based on a source or type of the communication.

While enhanced communication systems integrating multiple communication modes emphasize user-friendly and efficient facilitation of these communications using a single user interface, for example, and taking advantage of complementary features, different modalities are typically subject to distinctly handled policies. For example, email policies are defined and enforced by enterprise email servers while voice communication rules are handled by a separate service.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to adaptation and enforcement of policy rules for a particular communication mode to other communication modes in a dynamic and at least partially automated manner. According to some embodiments, organization level or personal policies for one communication mode are evaluated and adapted to other communication modes based on people, groups, or policy types. The communication modes may be integrated such as in an enhanced communication system or distinctly managed.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
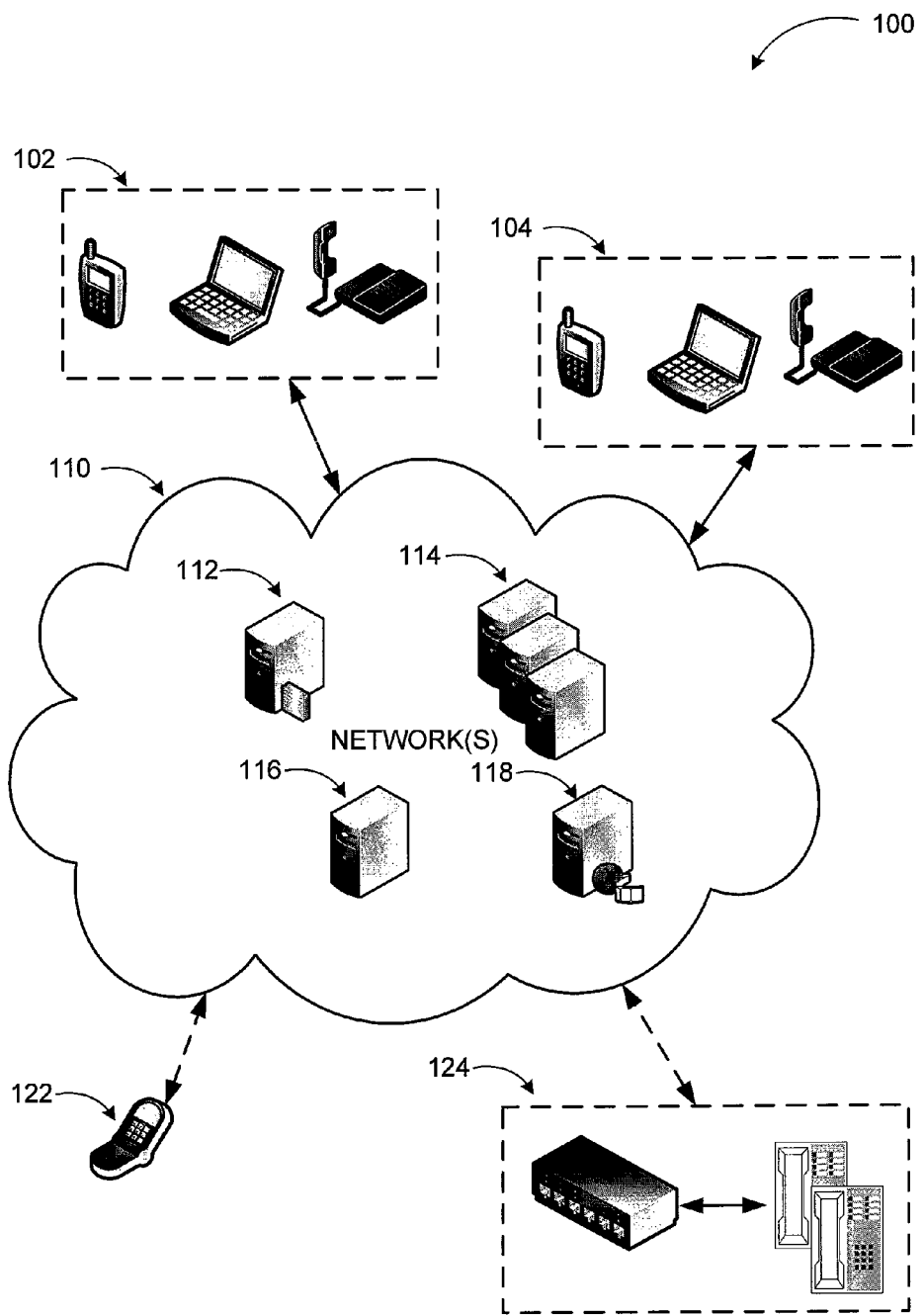
FIG. 1 is a diagram illustrating an example unified communications system, where embodiments may be implemented for policy rule application across communication modes.

As briefly described above, policies for a particular communication mode may be adjusted and implemented for other communication modes within an organization or for a group of users. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for executing a service for policy rule specification evaluation and enforcement on multiple communication modes. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below. Also, the term "dynamic" as used in conjunction with evaluation and enforcement of policy rules is intended to illustrate the distinction between conventional approaches, where static rules are store and enforced, and embodiments, which enable creation and updating of policy rules based on frequently changing parameters or communication modes.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, and web conferencing functionality.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 112 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent (e.g. Back-to-Back User Agent "B2BUA").

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real Time Protocol ("RTP").

Organizational and/or personal policy rules defined for a particular communication mode (e.g. email) may be enforced by one of the UC servers 114 in the UC system. The same server may determine other relevant communication modes (e.g. instant messaging, white-boarding, data sharing) to which the policy rules may be applied. Some or all of the rules may have to be adjusted for each communication mode according to the characteristics of the respective communication modes and applied by the same server or another one.

Figure 2:
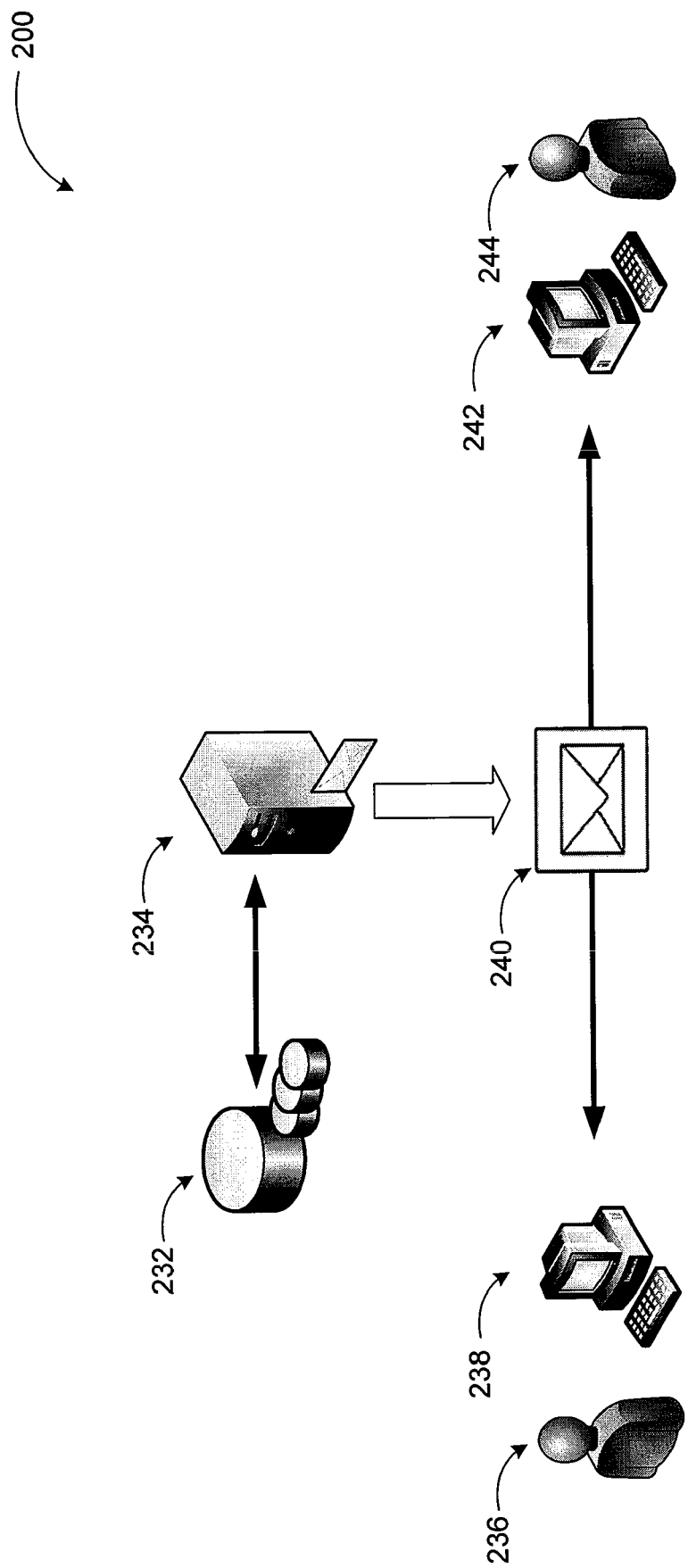
FIG. 2 is a conceptual diagram illustrating an example system for managing policy enforcement in an electronic mail exchange system.

While the example system in FIG. 1 has been described with specific components such as mediation server, A/V server, and similar devices, embodiments are not limited to this system of the example components and configurations. A service for policy rule specification, evaluation, and enforcement on multiple communication modes may be implemented in other systems and configurations employing fewer or additional components. Furthermore, such systems do not have to be enhanced communication systems integrating various communication modes. Embodiments may also be implemented in systems facilitating different communication modes distinctly by coordinating implementation of the rules across different communication modes using the principles described herein FIG. 2 is a conceptual diagram 200 illustrating an example system for managing policy enforcement in an electronic mail exchange system. While a system according to embodiments is likely to include a number of servers and services such as those illustratively discussed in FIG. 1, only those relevant to embodiments are shown in FIG. 2.

Policy compliance is increasingly more important for organizations, particularly in the area of business communications. Due to the complexity of policy rule evaluation and enforcement, some communication products provide little support to satisfy the enterprise customers' needs. Even for products that support this feature, different terminologies and technologies are adopted for various communication modes. Thus, consistent implementation of policy rules across different communication modes is typically performed manually by administrators.

In the example email exchange system of diagram 200, electronic mail messages 240 are exchanged between users (e.g. 236, 244) using client devices 238 and 242, respectively. The exchange is managed by an email management server 234. In addition to managing subscribers of the system performing tasks such as managing directory information, setting configuration parameters, monitoring network traffic for potential problems, and similar ones, email management server 234 may also manage policy implementation. Rules for particular organization policies as well as personal policies (of the subscribers) such as subject matter, ethical wall type, security, usage restrictions may be defined based on default rules, administrator or user input, and enforced by the server. Further examples of policy rules include, but are not limited to, record keeping rules, rules on communication involving external communicators, configuration and/or access limitations, and comparable ones. Information associated with the policy rules as well as any other information associated with the electronic mail exchange system may be stored in data stores 232 managed by email management server 234 or another server.

Figure 3:
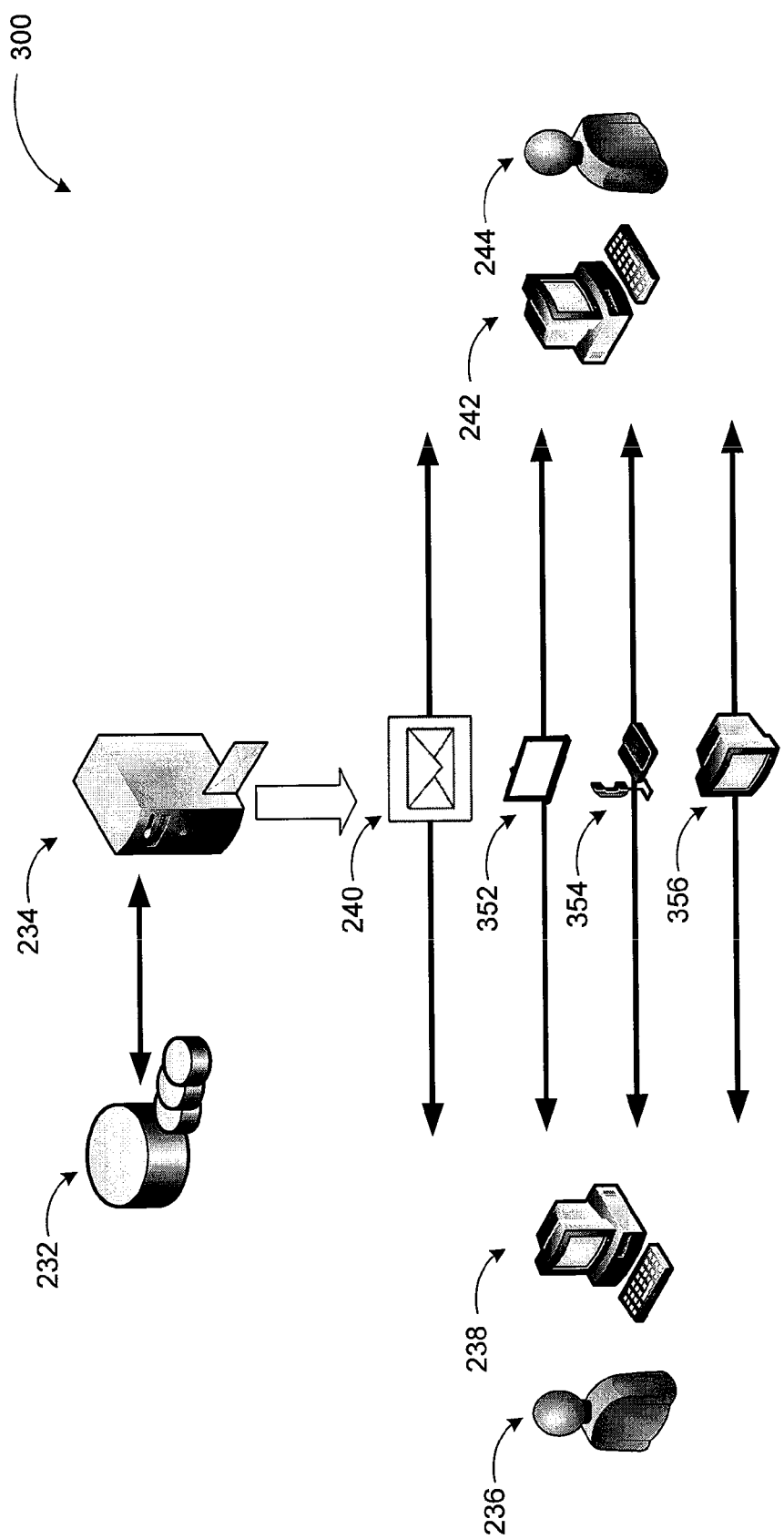
FIG. 3 is another conceptual diagram illustrating implementation of the policy enforcement based on the electronic mail exchange of FIG. 2 to other forms of communication according to embodiments.

FIG. 3 is another conceptual diagram 300 illustrating implementation of the policy enforcement based on the electronic mail exchange of FIG. 2 to other forms of communication according to embodiments. Implementation of policy rules based on one type of communication to other communication modes may be applied to any type of computer-assisted communications such as the example ones listed herein. Diagram 300 illustrates a limited number of example communication modes, which are not to be construed as a limitation on embodiments.

Components of the communication system shown in diagram 300 operate similar to the components discussed in conjunction with FIG. 2. Differently from FIG. 2, however, server 334 manages additional communication modes such as white-boarding 352, voice communication 354, and video communication 356. According to some embodiments, each of these communication modes may be facilitated independently from each other while the same set of basic policy rules are adapted to each mode and enforced. According to other embodiments, one or more of the communication modes may be facilitated as part of the same conversation session, and the rules applied similarly. According to further embodiments, the different communication modes may be facilitated/managed by distinct servers/systems (not shown) and the rules still applied to them consistently.

The policy rules may also be applied based on an association of the different communication modes with particular people, groups, or policy type(s). As discussed below in a specific example, the policy rules may be adapted for each communication mode being applied to different aspects of each communication mode (e.g. recordings of video communication, attachments of emails, and similar aspects). The policy rules may be organization level rules, personal rules, or a combination of the two. Each policy may include a set of default rules, which may be customized by administrators/users depending on policy/rule type.

While some of the rules may be static (e.g. access, security, update, etc. rules) as mentioned before, other types may change frequently based on conditions (evaluated by server 334) such as network usage, resource availability, and similar conditions. Moreover, applicability of the policy rules is not limited to communication applications only. In advanced communication modes such as email, white-boarding, data sharing, and so on, components of the communication such as attached data, recordings, etc. may be utilized by other applications like calendar applications, scheduling applications, word processing applications, spreadsheet applications, database applications, and comparable ones. Such applications may be local applications or distributed services executed by a central server and accessed through a browser or similar application.

Figure 4:
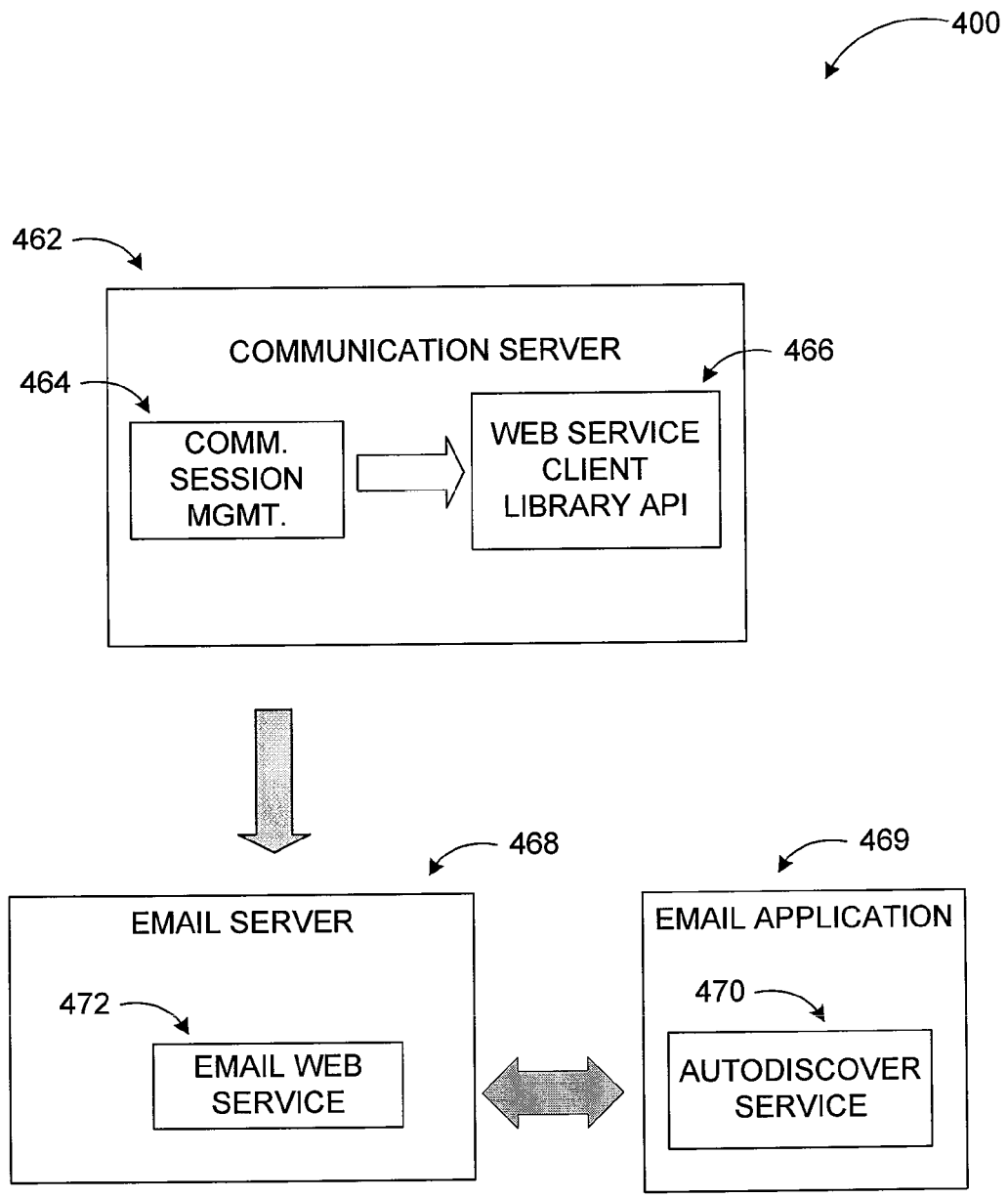
FIG. 4 illustrates major components in an example system implementing policy specification, evaluation, and enforcement on multiple communication modes.

FIG. 4 illustrates major components in an example system implementing policy specification, evaluation, and enforcement on multiple communication modes. In an example electronic mail exchange system a transport rule engine may specify various conditions and perform a list of actions. This functionality may be exposed through a web service so that an administrator may specify a set of policy rules that applies to communication service within an organization (or those managed by the administrator) and other communication applications are enabled to build their compliance feature on top of this service.

An illustrative example of policy rules that may be implemented across different communication modes is an ethical wall restriction. Commonly known in the legal profession, but increasingly encountered in multi-faceted organizations with varying operations, business interests, etc., this policy imposes restrictions on communication and/or handing of records between various people or groups within an organization. The rules for an ethical wall may vary. For example, a strict ethical wall may prohibit all communication between particular people or groups. On the other hand, some ethical walls may permit some forms of communication (e.g. voice communication may be allowed, but not electronic mail or other forms of data exchange). Yet other types of ethical walls may permit certain forms of communication but impose limits on communication records (recordings of voice/video communications), exchanged documents, and so on.

The example system of diagram 400 includes a communication server 462 executing, among other things, a communication session management module 464 managing a web service client library Application Programming Interface (API) 466, which evaluates whether a rule (e.g. the ethical wall rule) is applicable for a particular communication before it is initiated. The API may be employed for each session by the session management module.

Email server 468 executing email web service 472 implements the rules in an email communication. Auto discover service 470 executed on email application 469 may be used to find the right server, while email web service 472 on email server 468 implements the policy rules, which predicate evaluation and enforcement.

The above discussed scenarios, example systems, policies, and configurations are for illustration purposes. Embodiments are not restricted to those examples. Other forms of policies, configuration, communication modes, and scenarios may be used in implementing policy rule evaluation and enforcement across multiple communication modes in a similar manner using the principles described herein.

Figure 5:
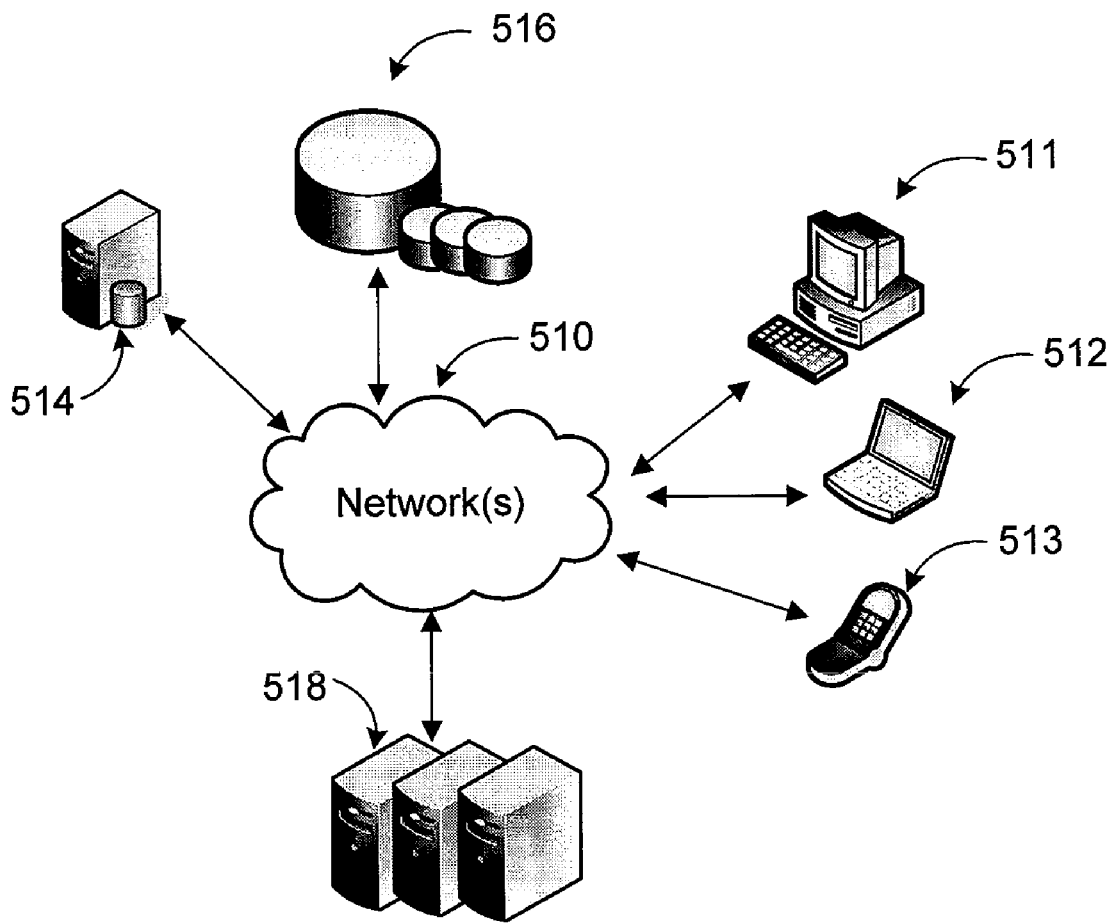
FIG. 5 is a networked environment, where a system according to embodiments may be implemented.

FIG. 5 is an example networked environment, where embodiments may be implemented. A platform providing communication services may be implemented via software executed over one or more servers 518 such as a hosted service. The platform may communicate with client applications on individual computing devices such as a cellular phone 513, a laptop computer 512, and desktop computer 511 (client devices) through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services may be enabled in conjunction with the available communications. Furthermore, subscribers are also provided presence information including location, contact information, alternative contacts, availability status, calendar information, and similar data that may be used in determining whether or not to initiate communication with a subscriber, which mode of communication, and similar decisions.

As discussed previously, client devices 511-513 are used to facilitate communications through a variety of modes between subscribers of the communication system. One or more of the servers 518 may manage determination (by default rules, user preferences, administrator customizations, and so on), implementation, and enforcement of policy rules for a number of available communication modes based on the rules applicable to a particular communication mode. Information associated with subscribers and facilitating communications such as policy rule may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a system for generating, updating, and managing alternate contact information. Furthermore, the networked environments discussed in FIG. 5 are for illustration purposes only. Embodiments are not limited to the example applications, modules, or processes.

Figure 6:
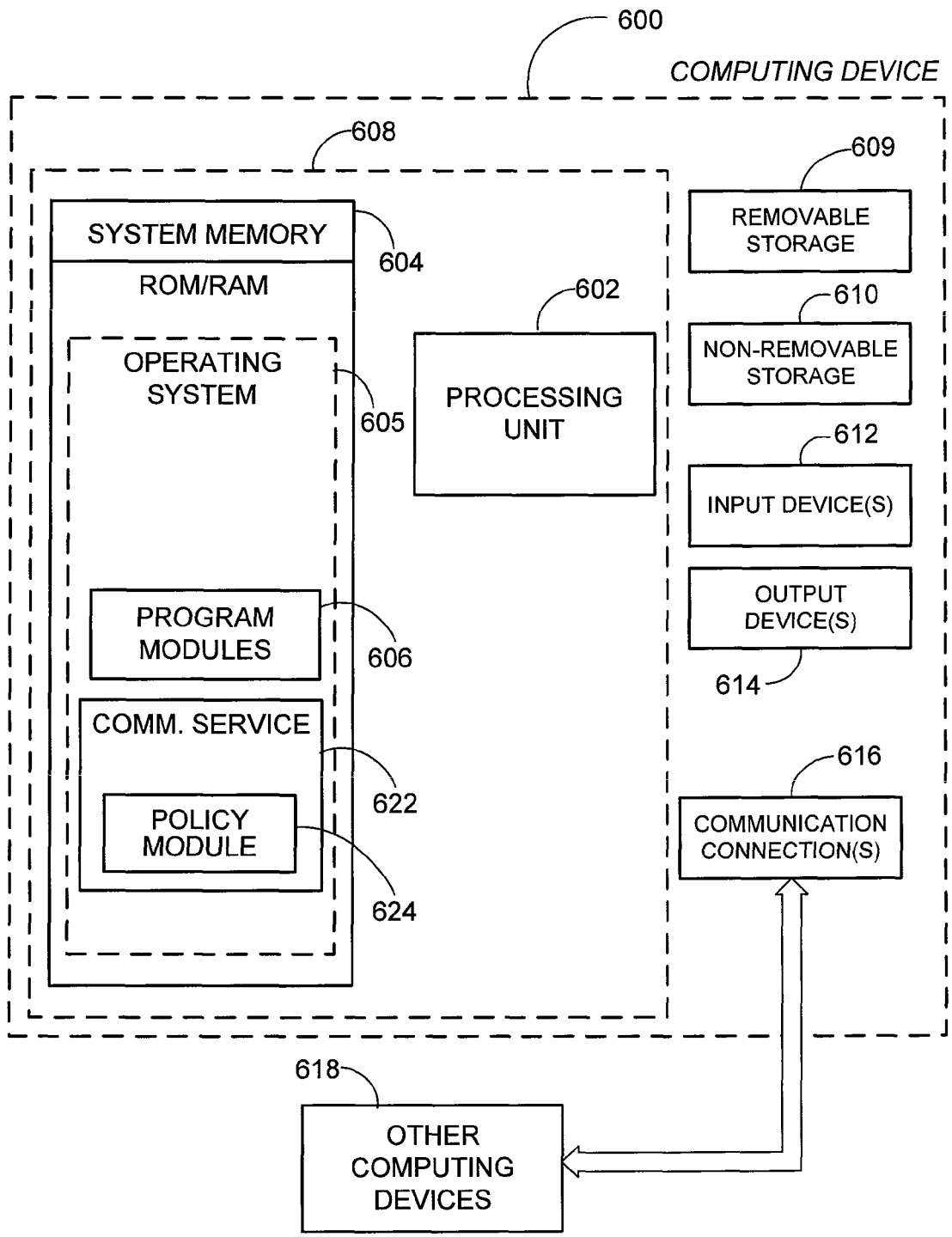
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a communication server or another server for managing implementation of policy rules on various communication modes and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, communication service 622, and policy module 624.

Communication service 622 may be any service that facilitates communication between client applications, servers, and other devices. Policy module 624 may manage policy rules associated with one communication mode and adapt and implement them on other communication modes as discussed previously. Policy module 624 and communication service 622 may be separate applications or integral modules of a hosted service that provides enhanced communication services to client applications/devices. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
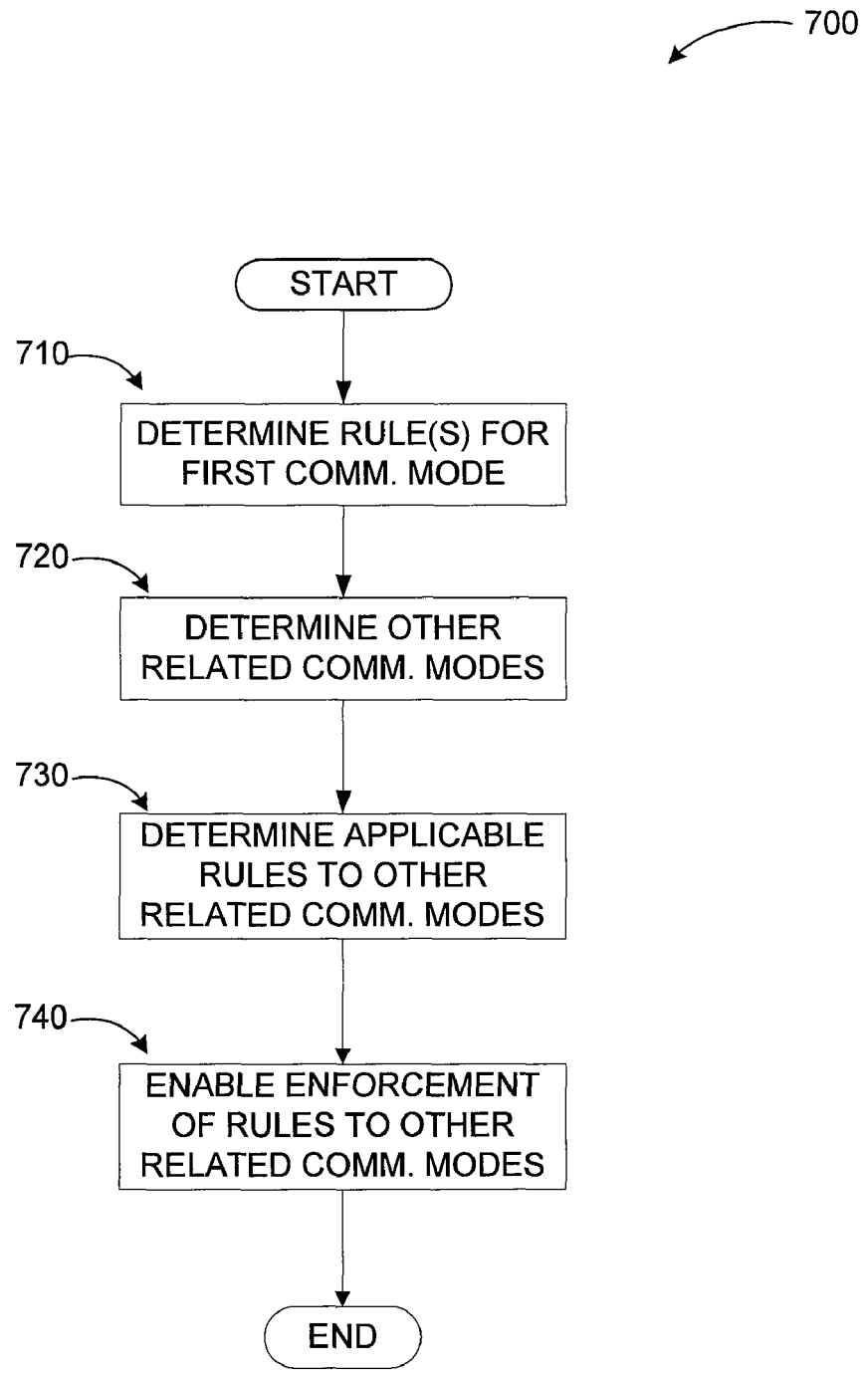
FIG. 7 illustrates a logic flow diagram for adaptation and enforcement of policies for a communication mode to other communication modes according to embodiments.

FIG. 7 illustrates a logic flow diagram of process 700 for adaptation and enforcement of policies for a communication mode to other communication modes according to embodiments. Process 700 may be implemented as part of a communication system that facilitates multiple communication modes.

Process 700 begins with operation 710, where rules for a first communication mode are determined. The rules for a particular communication mode may be predefined based on default system rules, customized based on administrator/user input, or even dynamically adjusted based on changing conditions (e.g. time of day, resource availability, communication traffic, and similar parameters). The rules may be a associated with communication quality, communication endpoints, communication content, or a communication format.

At operation 720, other related communication modes are determined. Other related communication modes may include communication modes facilitated by the same system, employed by the same group of users, associated with the same organization, and comparable ones. The other communication modes may be managed in an integrated manner with the first communication mode or distinctly.

At operation 730, policy rules applicable to the other related communication modes are determined. Some rules may be communication mode specific and not applicable to other communication modes (e.g. reduction of video resolution in a video conference system based on network load is not similarly applicable to instant messaging). Other rules may have to be adapted for particular communication modes (e.g. the video resolution example rule may be applied to email communication as reduction of allowed email size based on network load). Yet other rules may be applicable to a number of communication modes without modification (e.g. an ethical wall rule may be applicable the same way to email, instant messaging, and voice/video communications).

At operation 740, the rules determined/adapted at operation 730 are enforced to the other related communication modes. The rules may be implemented and enforced by the same server/application or by distinct servers/applications upon instructions from a policy management module.

The operations included in process 700 are for illustration purposes. A service for policy rule specification, evaluation, and enforcement on multiple communication modes may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method for implementing policy rules across a plurality of communication modes, the method comprising:
   at a first server:
      determining a first set of policy rules applicable to a first communication mode, the first communication mode including at least one from a set of: receiving a set of default rules, receiving customized rules from an administrator, receiving customized rules from a user, and determining rules dynamically based on predefined conditions, wherein the first set of policy rules includes at least one of: organization level rules and personal rules associated with individual users;
      determining a second communication mode related to the first communication mode;
      determining a second set of the policy rules based on the first set of policy rules applicable to the second communication mode, wherein:
         a portion of the first set of policy rules are identical to a corresponding portion of the second set of policy rules;
         another portion of the first set of policy rules are modified to derive a corresponding other portion of the second set of policy rules; and
         a further portion of first set of policy rules do not have a corresponding further portion of the second set of policy rules;
      enforcing the first set of policy rules on the first communication mode; and
      rendering the second set of policy rules available for enforcement on the second communication mode; and
   at a second server:
      receiving the second set of policy rules rendered by the first server; and
      enforcing the second set of policy rules on the second communication mode.

2. The method of claim 1, wherein the first communication mode and the second communication mode are determined to be related based on one of: being facilitated by the same system, being managed by the same server, being associated with the same organization, being associated with the same user, and being associated with the same set of policy rules.

3. The method of claim 1, wherein the portion of the policy rules is determined to be applicable to the second communication mode based on at least one from a set of: users associated with the first and second communication modes, groups associated with the first and second communication modes, a policy type associated with the first and second communication modes.

4. The method of claim 1, wherein a first portion of the applicable policy rules are applied to the second communication mode in the same manner as applied to the first communication mode.

5. The method of claim 1, wherein a second portion of the applicable policy rules are modified prior to being applied to the second communication mode.

6. The method of claim 5, wherein the second portion of the applicable policy rules are modified based on at least one from a set of: a network usage, a resource availability, and a user parameter.

7. The method of claim 1, wherein the plurality of policy rules and the applicable portion of the policy rules are implemented by one of: a single service and a plurality of distinct services.

8. The method of claim 1, wherein the plurality of policy rules are associated with at least one from a set of: a subject matter limitation, an ethical wall type limitation, a security limitation, a usage limitation, and a configuration limitation.

9. The method of claim 1, wherein the first and second communication modes include at least one from a set of: a voice communication, a video communication, an instant messaging session, application sharing, data sharing, whiteboarding, and an electronic mail exchange, and wherein the first and second communication modes are facilitated between client applications executed on one of: a smart phone, a cellular phone, a smart automobile console, a desktop computer, a laptop computer, and a handheld computer.

10. A communication system for implementing policy rules across a plurality of communication modes, the communication system comprising:
  a first server configured to:
    determine a first set of policy rules applicable to a first communication mode including at least one from a set of: receiving a set of default rules, receiving customized rules from an administrator, receiving customized rules from a user, and determining rules dynamically based on predefined conditions, wherein the first set of policy rules includes at least one of: organization level rules and personal rules associated with individual users;
    determine a second communication mode related to the first communication mode;
    determine a second set of the policy rules based on the first set of policy rules applicable to the second communication mode, wherein:
      a portion of the first set of policy rules are identical to a corresponding portion of the second set of policy rules;
      another portion of the first set of policy rules are modified to derive a corresponding other portion of the second set of policy rules; and
      a further portion of first set of policy rules do not have a corresponding further portion of the second set of policy rules;
    enforce the first set of policy rules on the first communication mode; and
    render the second set of policy rules available for enforcement on the second communication mode; and
  a second server configured to:
    receive the second set of policy rules; and
    enforce the second set of policy rules on the second communication mode.

11. The system of claim 10, wherein the first and second communication modes are facilitated in an integrate manner.

12. The system of claim 10, wherein the first and second communication modes are part of the same conversation session.

13. The system of claim 10, wherein the first set of policy rules is associated with one of: a communication quality, communication endpoints, communication content, and a communication format.

14. The system of claim 10, further comprising a plurality of additional servers, wherein at least a portion of the additional servers is associated with a different communication network, the additional servers configured to:
  receive the first set of policy rules;
  determine additional sets of policy rules based on the first set of rules; and
  enforce the additional sets of policy rules on additional communication modes associated with the first communication mode.

15. A computer-readable storage device with instructions stored thereon for implementing policy rules across a plurality of communication modes, which when executed by a communication system cause:
  a first server to:
    determine a first set of policy rules applicable to a first communication mode including at least one from a set of: receiving a set of default rules, receiving customized rules from an administrator, receiving customized rules from a user, and determining rules dynamically based on predefined conditions, wherein the first set of policy rules includes at least one of: organization level rules and personal rules associated with individual users;
    determine a second communication mode related to the first communication mode;
    determine a second set of the policy rules based on the first set of policy rules applicable to the second communication mode, wherein:
      a portion of the first set of policy rules are identical to a corresponding portion of the second set of policy rules;
      another portion of the first set of policy rules are modified to derive a corresponding other portion of the second set of policy rules; and
      a further portion of first set of policy rules do not have a corresponding further portion of the second set of policy rules;
    enforce the first set of policy rules on the first communication mode; and
    render the second set of policy rules available for enforcement on the second communication mode; and
  a second server to:
    receive the second set of policy rules; and
    enforce the second set of policy rules on the second communication mode.

16. The computer-readable storage device of claim 15, wherein the sets of policy rules are exposed through a web service for implementation on other communication modes.

17. The computer-readable storage device of claim 15, wherein the first set of policy rules is associated with at least one component of the first communication mode employed by one of: a calendar application, a scheduling application, a word processing application, a spreadsheet application, a database application, and a browser application.

* * * * *